(12) United States Patent
Popa et al.

(10) Patent No.: US 10,162,069 B2
(45) Date of Patent: Dec. 25, 2018

(54) METHOD FOR LINEARIZING ATTENUATION MEASUREMENTS TAKEN BY A SPECTROMETRY SENSOR

(71) Applicant: Commissariat A L'Energie Atomique et aux Energies Alternatives, Paris (FR)

(72) Inventors: Emil Popa, Grenoble (FR); Veronique Rebuffel, Corenc (FR)

(73) Assignee: Commissariat à l'énergie atomique et aux énergies alternatives, Paris (FR)

( * ) Notice: Subject to any disclaimer, the term of this patent is extended or adjusted under 35 U.S.C. 154(b) by 403 days.

(21) Appl. No.: 14/677,293

(22) Filed: Apr. 2, 2015

(65) Prior Publication Data

US 2015/0285925 A1    Oct. 8, 2015

(30) Foreign Application Priority Data

Apr. 7, 2014    (FR) .................................... 14 53051

(51) Int. Cl.
*G01D 18/00* (2006.01)
*G01T 7/00* (2006.01)
*G06T 11/00* (2006.01)

(52) U.S. Cl.
CPC ............ *G01T 7/005* (2013.01); *G06T 11/005* (2013.01)

(58) Field of Classification Search
CPC ........... G01N 23/087; G01N 2223/419; G01N 23/046; G06T 11/006; G06T 2211/424;

(Continued)

(56) References Cited

U.S. PATENT DOCUMENTS

2007/0217566 A1    9/2007    Chen et al.
2009/0161933 A1    6/2009    Chen
(Continued)

FOREIGN PATENT DOCUMENTS

WO    WO 01/84500 A2    11/2001
WO    WO 2013/011031 A1    1/2013

OTHER PUBLICATIONS

French Preliminary Search Report dated Nov. 25, 2014 in French Application 14 53051, filed on Apr. 7, 2014 ( with English Translation of Categories of Cited Documents).

(Continued)

*Primary Examiner* — Robert G Bachner
(74) *Attorney, Agent, or Firm* — Oblon, McClelland, Maier & Neustadt, L.L.P.

(57) ABSTRACT

The invention relates to a method for linearizing attenuation measurements obtained by means of a direct conversion spectrometer. The spectrometer comprises a radiation source and a detector for detecting said radiation after it has passed through an object. An attenuation measurement is represented by a vector $M^d$ giving the attenuation of the radiation in a plurality $N_k$ of energy channels of the detector, said spectrometer being characterized by a response matrix $\Psi$. Said method estimates, by means of an iterative process, a vector $M^{lin}$, called an equivalent linear attenuation vector, giving for each energy channel an attenuation linearly depending on the thickness of the material through which the radiation passes. Said method is applicable to the characterization of the material as well as to the reduction of artifacts in computed tomography.

11 Claims, 8 Drawing Sheets

(58) Field of Classification Search
CPC ......... G06T 2211/412; G06T 2211/421; A61B 6/037; G01T 1/366; G01T 7/005; G06F 17/18
See application file for complete search history.

(56) References Cited

U.S. PATENT DOCUMENTS

2012/0239310 A1   9/2012   Ouvrier-Buffet et al.
2013/0110438 A1   5/2013   Rinkel et al.

OTHER PUBLICATIONS

A. Potop et al. "Investigation of the polynomial approach for material decomposition in spectral X-ray tomography using an energy-resolved detector", Medical Imaging 2014, Proc of SPIE, vol. 9033, 2014, 10 pages.
Jean Rinkel et al. "Quantitative Digital Radiography Image Processing", Photon-Based Medical Imagery, Feb. 13, 2013, 38 pages.
J. Kukal et al. "Using Radon Transform for Denoising of Biomedical Image", http://dsp.vscht.cz/gavlasoa/web-sontent/papers/06Mendel_radon_PAPER.pdf, XP055150322, 2006, 4 pages.
Martin, L., "Enhanced Information Extraction in Multi-Energy X-Ray Tomography for Security", Retrieved from the internet: URL:http://people.bu.edu/limor/Limor%20Martin%20Dissertation%20rev%201.pdf, Mar. 30, 2014, pp. 1-225 with cover pages.

METHOD FOR LINEARIZING ATTENUATION MEASUREMENTS TAKEN BY A SPECTROMETRY SENSOR

TECHNICAL FIELD

The present invention relates to the field of transmission spectrometry imaging as well as that of tomography (CT) by X rays or gamma rays.

STATE OF PRIOR ART

Direct conversion spectrometry uses a semi-conductor detector (for example of CdTe), generally discretised as a strip or an array of elementary sensors, wherein the photons of an incident radiation (X or gamma) create a cloud of electron charges (in the order of 1 000 electrons for a 60 keV X photon). The charges thus generated are collected by electrodes associated with the elementary sensors and form a transient electrical signal having the form of pulses. The integral of such a pulse is generally proportional to the energy deposited by the incident photon. An electronic circuit connected to the sensor enables this integral to be estimated by a measurement of the pulse amplitude, which enables the energy deposited by the incident photon to be estimated. After digitizing, the values of the energies measured are distributed into energy channels or energy bins as a histogram enabling the radiation spectrum to be built after interaction with the irradiated object. This spectrum provides in particular information about the density and nature of the object.

However, the spectrum provided by such a spectrometer is deformed with respect to the actual spectrum of the incident radiation because of energy-dispersive physical interactions between the radiation and the detector. More precisely, charge sharing and induction sharing phenomena result in an overestimation of low energy photons and underestimation of high energy photons in the spectrum.

These phenomena cause measurement artifacts depending on the thickness of the irradiated object. Indeed, the higher the thickness through which the radiation passes, the more offset its spectrum towards high energies. This is called "spectrum hardening". This effect is all the more marked that the energy channels used by the spectrometer are wide.

The spectrum hardening results in erroneous attenuation measurements, not linearly depending on the thickness through which the radiation passes.

In a similar way, the spectrum hardening generates artifacts in computed tomography images, in particular so-called "cupping artifacts" and "streaking artifacts" in inhomogeneous materials. These artifacts are detrimental to the interpretation and exploitation of the images obtained.

The object of the present invention is to correct attenuation measurements taken by a direct conversion spectrometer such that they linearly depend on the thickness of the material through which the radiation passes.

An additional object of the present invention is to reduce cupping and streaking artifacts in computed tomography.

DISCLOSURE OF THE INVENTION

The present invention is defined by a method for linearizing attenuation measurements obtained by means of a direct conversion spectrometer comprising a radiation source and a detector for detecting said radiation after it has passed through an object, an attenuation measurement being represented by a vector $M^d$ giving the attenuation of the radiation in a plurality $N_k$ of energy channels of the detector, the actual attenuation of the material constituting the object being resolved into a characteristic base of the attenuation in this material, $\mu_n$, n=1, ..., N with N≥2;

said spectrometer being characterized by a response matrix $\Psi$ giving, for a plurality $N_k$ of energy bins, the probability that a photon emitted in an energy bin h=1, ..., $N_h$ is detected in an energy channel.

Said method estimates a vector $M^{lin}$, called an equivalent linear attenuation vector, giving for each energy channel an attenuation linearly depending on the thickness of material through which the radiation passes, said method comprising an initialization step wherein $M^{lin}$ is estimated by the attenuation measurement $M^d$ and a succession of iterations, each iteration j providing an estimate $\hat{M}^{lin}(j)$ and comprising:

(a) a step of projecting the estimate $\hat{M}^{lin}(j-1)$ of $M^{lin}$ obtained at the previous iteration onto an image base $\Psi\mu_n$, n=1, ..., N, image by said response matrix $\Psi$ of said characteristic base of the attenuation of the material;

(b) a step of determining an energy non linear deformation, T, of the components of the estimate $\hat{M}^{lin}(j-1)$ for obtaining a corresponding attenuation $M_r^d(j)$ in said different energy channels, in accordance with a non linear model of the spectrometer;

(c) a step of reverse deformation of the components of $M^d$ to provide a new estimate $\hat{M}^{lin}(j)$ of the equivalent linear attenuation $M^{lin}$ of said attenuation measurement, or of the components $\hat{c}_1, \ldots, \hat{c}_N$ of said equivalent linear attenuation $M^{lin}$ in said image base.

The iterations can be stopped when a predetermined number ($j_{max}$) of iterations is reached.

Alternatively, they can be stopped when a convergence criterion of the estimate of the equivalent linear attenuation is met.

According to a first alternative, the characteristic base of the material is a base of vectors a $\mu_{Co}$, $\mu_{Ph}$ where $\mu_{Co}$ gives the linear attenuation coefficient of the radiation due to the Compton effect in the different energy bins and $\mu_{Ph}$ gives the attenuation coefficient of the radiation due to the photoelectric effect in the different energy bins, the vector of the actual attenuation coefficients $\mu^i$ of the material in these different bins being obtained as a linear combination of the vectors $\mu_{Co}$, $\mu_{Ph}$.

According to another alternative, the characteristic base of the material is a base of vectors $\mu_n$, n=1, ..., N, relating to reference materials, each vector of this base giving the actual attenuation coefficients in the different energy bins for a reference material.

In step (a) of an iteration j, a vector $\hat{c}_j$ of size N is advantageously determined giving the components of $\hat{M}^{lin}(j-1)$ in the image base $\Psi\mu_n$, n=1, ..., N.

The non-linear transformation T can then be determined by estimating the actual attenuation in the material from $\hat{M}_t(j)$. $B_\mu \hat{c}_j$, where $B_\mu$ is a matrix the columns of which consist of the vectors $\mu_n$, n=1, ..., N, and by calculating the diagonal matrix $W_j^d$ such that $W_j^d \hat{M}^{lin}(j-1) = M_r^d(j)$ where $M_r^d(j) = -\ln(\Psi e^{-B_\mu \hat{c}_j})$.

In step (c) of iteration j, the new estimate $\hat{M}^{lin}(j)$ of the equivalent linear attenuation is advantageously obtained by means of $\hat{M}^{lin}(j) = (W_j^d)^{-1} M^d$.

According to a preferred embodiment of the invention, the linearization method further provides a characterization of the material from the components $\hat{c}_1, \ldots, \hat{c}_n$ of said equivalent linear attenuation $M^{lin}$ in said image base. This characterization can be in particular a composition of the material in said reference materials.

BRIEF DESCRIPTION OF THE DRAWINGS

Further characteristics and advantages of the invention will appear upon reading a preferential embodiment of the invention made in reference to the appended figures from which.

DETAILED DISCLOSURE OF PARTICULAR EMBODIMENTS

Figure 1:
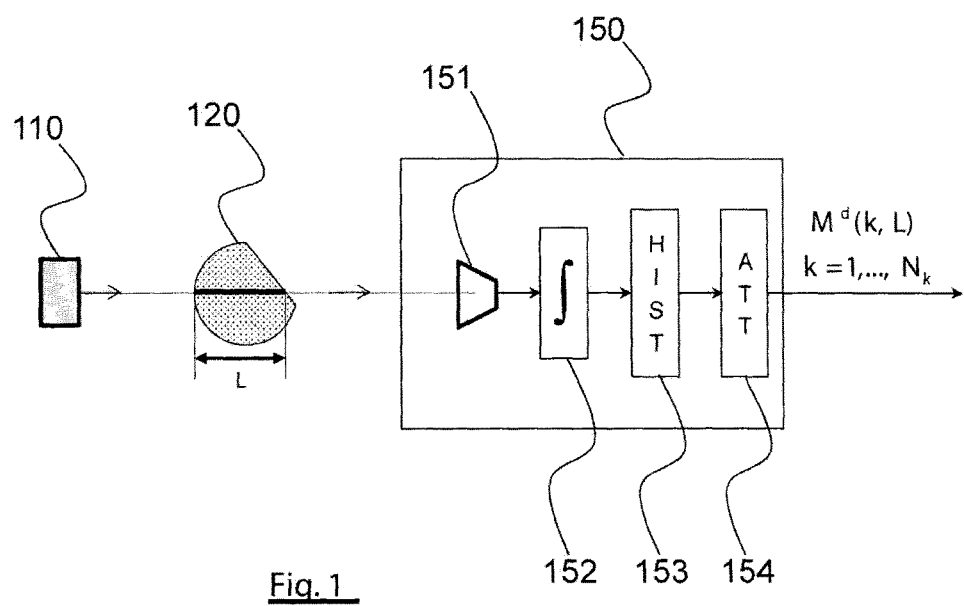
FIG. 1 represents an experimental scheme using a direct conversion spectrometer known to the state of the art.

Before allowing a better understanding of the correction process according to the invention, the spectrum hardening phenomenon will first be modeled within the scope of a simple experimental scheme, illustrated in FIG. 1.

This experimental scheme uses a radiation source, 110, for example an X or gamma radiation source. The photon beam emitted by the source passes through a homogeneous object, 120, the attenuation of which or more precisely the linear attenuation coefficient of which is desired to be measured, hereinafter more simply called attenuation coefficient. After it has passed through the object, the beam arrives on the detector of a direct conversion spectrometer, 150. The detector, 151, is connected to the pulse integration device, 152, providing for each pulse a corresponding energy value. The counting module, 153, distributes the energy values thus obtained into energy bins (energy channels) to give the spectrum of the radiation that has passed through the object. A calculation module, 154, can estimate the attenuation by the object in the different bins if it knows the radiation spectrum of the source or if it has measured it beforehand in the absence of the object (so-called full flow measurement).

If l represents the coordinate along the beam, the thickness of the material through which the radiation passes is none other than:

$$L = \int_\Gamma dl \qquad (1)$$

where $\Gamma$ is the intersection of the beam trajectory with the object 120.

The energy spectrum of the radiation that has passed through the object is given by the Beer-Lambert law:

$$n^i(E) = n_0^i(E) e^{-\mu^i(E)L} \qquad (2)$$

where $n_0^i(E)$ is the amount of radiation emitted by the source, at the energy E, $n^i(E)$ is the amount of radiation that has passed through the object, at the energy E, and $\mu^i(E)$ is the attenuation coefficient of the material for photons of energy E. The index i indicates that the radiation spectrum is considered as incident on the spectrometer, as opposed to the index d, used below to designate the spectrum actually measured by the spectrometer.

In order to be able to perform a vector processing of the source spectrum, it will be assumed that the axis of the energies is discretised into a plurality of indexed bins $h = 1, \ldots, N_h$ of an arbitrarily low width (for example in the order of 1 keV). The expression (2) is then reflected in a discrete form by:

$$n^i(h) = n_0^i(h) e^{-\mu^i(h)L} \qquad (3)$$

The term $\mu^i(h)$ represents the actual linear attenuation coefficient of the material, independently of any measurement.

The physical quantity $\mu^i(h)L$ represents the attenuation of the radiation, that has passed through the thickness L, for the energy bin h and will be noted $M^i(h,L)$ below. In the case where the object is not homogeneous, the trajectory $\Gamma$ can be resolved into unit segments of attenuation coefficients $\mu^i(h,l)$ and the total attenuation of the beam for the bin h is then simply:

$$n^i(h) = n_0^i(h) e^{-M^i(h,L)} \text{ with } M^i(h, L) = \int_\Gamma \mu^i(h, l) \, dl \qquad (4)$$

If an ideal detector is available, $n^i(h)$ can be accessed and the attenuation coefficient on the beam path can be deduced therefrom:

$$\mu^i(h) = -\frac{1}{L} \ln\left(\frac{n^i(h)}{n_0^i(h)}\right) = \frac{\int_\Gamma \mu^i(h, l) \, dl}{L} \qquad (5)$$

It will be understood that the attenuation coefficient measured by an ideal detector is thus equal to the average of the attenuation coefficients encountered, weighted by the thicknesses through which the radiation passes on the path.

In practice, the spectrometer is not ideal and a photon of a given energy can generate a response in several adjacent energy channels. The energy channels used by the detector will be indexed by $k = 1, \ldots, N_k$ with $N_k \ll N_h$ and the spectral densities measured by the spectrometer will be noted $n^d(k)$, $k = 1, \ldots, N_k$.

It will be understood that the discretisation into energy bins $h = 1, \ldots, N_h$ can be made arbitrarily fine to model the theoretical spectrum whereas the discretisation into energy channels $k = 1, \ldots, N_k$ is conditioned by the spectrometer for counting the pulses.

The relationships relating the actual densities $n^d(k)$ to the theoretical densities $n^i(h)$ are complex because of the great number of physical phenomena occurring. If non-linear phenomena such as stacking, drift or detector's memory effect phenomena are disregarded, the actual densities can be linearly expressed from the theoretical densities as:

$$n^d(k) = \sum_h n^i(h)\Phi(k, h) \qquad (6)$$

The relationship (6) can be equivalently expressed in the following matrix form:

$$n^d = \Phi n^i \qquad (7)$$

where $n^d = n^d(1), \ldots, n^d(N_k))^T$ is the vector of the spectral densities measured by the spectrometer, $n^i = (n^i(1), \ldots, n^i(N_h))^T$ is the vector of the spectral densities of the source and $\Phi$ is the matrix of size $N_k \times N_h$ formed by the coefficients $\Phi(k,h)$, $k=1, \ldots, N_k$, $n=1, \ldots, N_h$.

The expression (7) gives the spectral density measured by the detector under full flow conditions from the spectral density of the source. More precisely, the element $\Phi(k,h)$ of the matrix $\Phi$ is the average number of photons detected in the energy channel k when the source emits a photon in the energy bin h. The matrix $\Phi$ consequently only depends on the detector and will be called response matrix of the detector for this reason. For an ideal detector, $N_k = N_h$ and the matrix $\Phi$ is none-other than the identity matrix.

It is reminded that the attenuation of the radiation measured by means of an ideal detector is given by the expression (4), that is:

$$M^i(h, L) = -\ln \frac{n^i(h, L)}{n^i_0(h, L)} \qquad (8)$$

On the other hand, when the attenuation of the radiation is measured using an actual detector:

$$M^d(k, L) = -\ln \frac{n^d(k, L)}{n^d_0(k, L)} = -\ln \frac{\sum_h \Phi(k, h) n^i_0(h) e^{-M^i(h,L)}}{\sum_h \Phi(k, h) n^i_0(h)} \qquad (9\text{-}1)$$

$$M^d(k, L) = -\ln \frac{n^i(k, L)}{n^i_0(k, L)} = -\ln \frac{\sum_h \Phi(k, h) n^i_0(h) e^{-M^i(h,L)}}{\sum_h \Phi(k, h) n^i_0(h)}$$

that is further in the following more condensed form:

$$M^d(k, L) = -\ln\left(\sum_h \Psi(k, h) e^{-M^i(h,L)}\right) \qquad (9\text{-}2)$$

having defined the coefficients $\Psi(k,h)$ by $$\Psi(k, h) = \frac{\Phi(k, h) n^i_0(h)}{\sum_h \Phi(k, h) n^i_0(h)}.$$

Therefore, it is understood that, in the case of a homogeneous object, if the attenuation measured using an ideal detector does linearly depend on the thickness through which the beam ($M^i(h,L) = \mu^i(h)L$) passes, the same is no longer true for an actual detector $$\left(M^d(k, L) = -\ln\left(\sum_{h=1}^{N_h} \Psi(k, h) e^{-\mu^i(h)L}\right)\right),$$

in other words the attenuation coefficient measured $$\mu^d(k, L) = \frac{1}{L} M^d(k, L)$$

depends on the thickness L through which the beam passes. The same conclusion is drawn a fortiori for an inhomogeneous material.

The matrix $\Psi$ of size $N_k \times N_h$ both depends on the source and the response of the detector, for this reason it will be hereinafter called the response matrix of the system. An element $\Psi(k,h)$ of the matrix represents, under full flow conditions (thus in the absence of an object between the source and the detector), the probability that a photon detected in the channel k is actually coming from a channel h of the source, in other words the coefficient $\Psi(k,h)$, $k \neq h$, represents the probability of failed detection in the channel k given that the photon emitted was in the channel h. Further, the coefficient $\Psi(k,k)$ represents the probability of successful detection of a photon in the channel k. When the system is ideal, $N_k = N_h$ and the matrix $\Psi$ is, as the response matrix of the detector, equal to the identity matrix of size $N_h \times N_h$.

Because of the convexity of the function $-\ln(x)$, there is the following relationship:

$$M^d(k, L) \leq \sum_h \Psi(k, h) M^i(h, L) \qquad (10)$$

The equivalent linear attenuation $M^{lin}(k,L)$ is thus defined by:

$$M^{lin}(k, L) = \sum_k \Psi(k, h) M^i(h, L) \qquad (11)$$

For a homogeneous material, the equivalent linear attenuation coefficient can be defined in a similar way by:

$$\mu^{lin}(k) = \sum_h \Psi(k, h) \mu^i(h) \qquad (12)$$

Thus, the attenuation measured, respectively the attenuation coefficient measured, is raised by the equivalent linear attenuation, respectively the equivalent linear attenuation coefficient:

$$M^d(k,L) \leq M^{lin}(k,L) \text{ and } \mu^d(k) \leq \mu^{lin}(k) \qquad (13)$$

The expressions (11) and (12) can be considered in a more condensed way as a matrix form:

$$M^{lin}(L) = \Psi M^i(L) \text{ and } \mu^{lin} = \Psi \mu^i \qquad (14)$$

where $\Psi$ is the matrix $N_k \times N_h$ consisting of the elements $\Psi(k,h)$, $M^{lin} = (M^{lin}(1,L), \ldots, M^{lin}(N_k,L))^T$ and $\mu^{lin} = (\mu^{lin}(1), \ldots, \mu^{lin}(N_k))^T$.

It is important to note that the attenuation $M^d(k,L)$ measured asymptotically approaches $M^{lin}(k,L)$ and when the thickness L through which the radiation passes tends to zero. In a similar way, for a homogeneous material, the attenuation coefficient $$\mu^d(k, L) = \frac{M^d(k, L)}{L}$$

measured asymptotically approaches $\mu^{lin}(k)$ when the thickness L through which the radiation passes tends to zero.

Physically, the equivalent linear attenuation coefficient represents the attenuation coefficient measured of a very fine homogeneous sample of the object. Conversely, when the object is not homogeneous, the equivalent linear attenuation coefficient represents the average of the linear attenuation coefficient on the beam trajectory. Indeed:

$$\mu^{lin}(L) = \frac{M^{lin}(L)}{L} = \frac{1}{L}\Psi M^i(L) = \Psi \frac{1}{L}\int_T \mu^i(l)dl = \frac{1}{L}\int_T \mu^{lin}(l)dl \quad (15)$$

In the other hand, it will be noted that this linearity property does not hold for the attenuation coefficient $$\mu^d(k, L) = \frac{1}{L}M^d(k, L)$$

measured.

Figure 2:
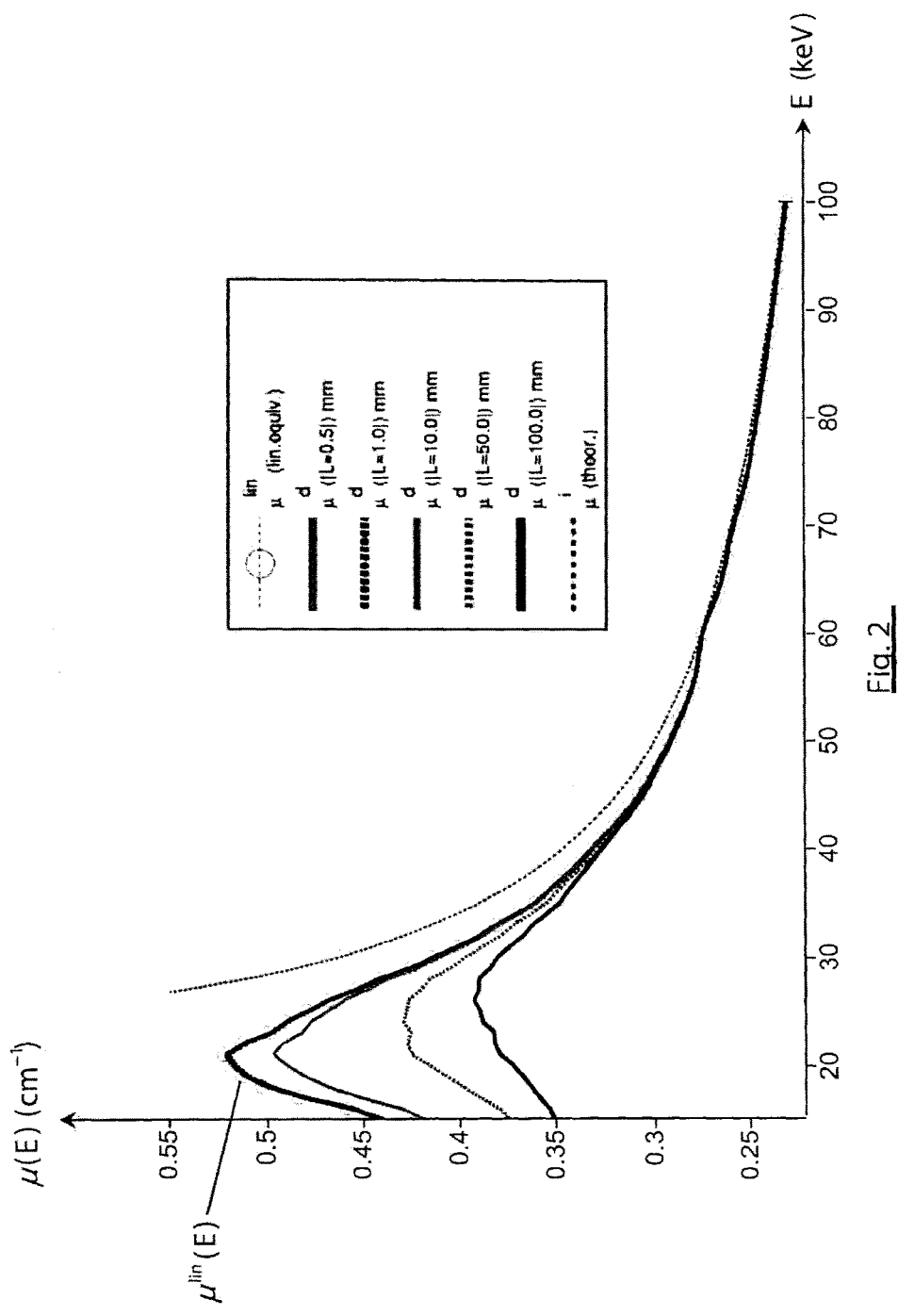
FIG. 2 represents curves of attenuation coefficients as a function of the energy channels.

FIG. 2 represents curves of attenuation coefficients measured using a direct conversion spectrometer, as a function of energy. These curves are relating to polyoxymethylene samples of different thicknesses. The radiation source is a tungsten-based X ray source and the semi-conductor detector is a line CdTe detector with a 0.8 mm pitch and a 3 mm thickness. The energy channels of the detector are 1 keV wide.

The curve designated by small circles corresponds to the equivalent linear attenuation coefficient $\mu^{lin}$. As predicted, it is noticed that for small thicknesses, the curves of the attenuation coefficients measured are almost the same as the curve of the equivalent linear attenuation coefficient.

The idea underlying the invention is, for a given attenuation measurement, to estimate the equivalent linear attenuation or the equivalent linear attenuation coefficient, using an attenuation model of a material.

Figure 3:
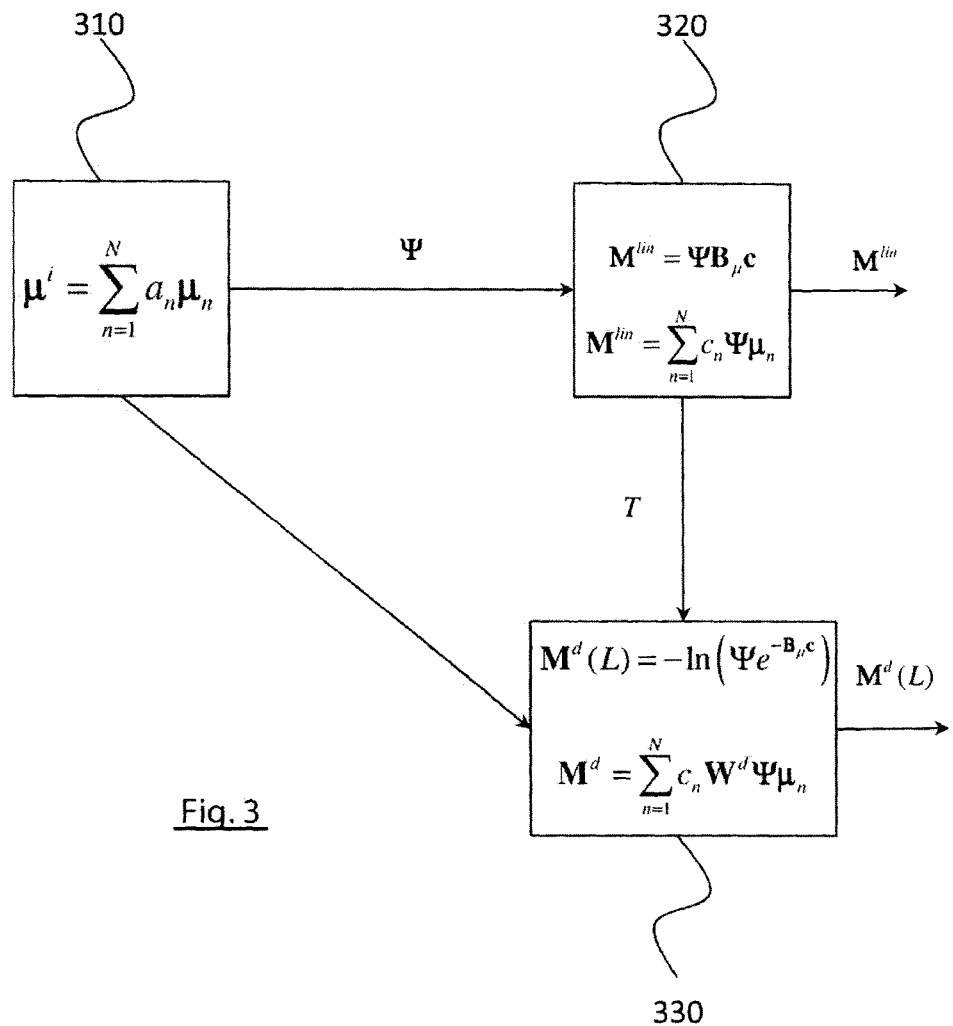
FIG. 3 schematically represents a model of the attenuation measured by a direct conversion spectrometer.

FIG. 3 represents a modeling of an attenuation measurement by a direct conversion spectrometer from an attenuation model of the material.

An attenuation model of the material has been represented in 310. According to this model, the actual attenuation/(linear) attenuation coefficient of the material is resolved according to a base of attenuation vectors, being characteristic of the material.

Thus, the actual attenuation coefficient is resolved according to a base of attenuation vectors $\mu_n$, n=1, ..., N:

$$\mu^i(h) = \sum_{n=1}^{N} a_n \mu_n(h), h = 1, \ldots, N_h \quad (16\text{-}1)$$

that is further, in vector form:

$$\mu^i = \sum_{n=1}^{N} a_n \mu_n \quad (16\text{-}2)$$

where $\mu^i=(\mu^i(1), \ldots, \mu^i(N_h))^T$ is the vector of the actual attenuation coefficients of the material at the energies 1, ..., $N_h$, and $\mu_n=(\mu_n(1), \ldots, \mu_n(N_h))^T$, n=1, ..., N are the vectors of the characteristic base of the material, and $a_n$, n=1, ..., N, are the components of $\mu$ in this base. It is essential to note that the components $a_n$ do not depend on energy.

The relationship (16-1) can in particular result from the discretisation of the attenuation function of the material when the same can be expressed according to a linear combination of unit functions:

$$\mu^i(E) = \sum_{n=1}^{N} a_n \mu_n(E) \quad (17)$$

where $\mu^i(E)$ is the attenuation function of the material as a function of energy E of the radiation and $\mu_n(E)$, N form a base of functions.

For a thickness L through which passes the beam, the attenuation can be resolved in a similar way to (16-1), using the same characteristic base:

$$M(h, L) = \sum_{n=1}^{N} c_n(L)\mu_n(h), h = 1, \ldots, N_h \quad (18\text{-}1)$$

that is further, in vectorial form:

$$M(L) = \sum_{n=1}^{N} c_n(L)\mu_n \quad (18\text{-}2)$$

with $c_n(L)=La_n$. The components $c_n(L)$ only depend on the thickness L and not on energy h. They physically represent equivalent attenuation lengths for the different vectors of the characteristic base.

According to a first alternative, the vectors of the characteristic base are relating to distinct physical mechanisms. Thus, it is known that X rays are essentially attenuated because of the Compton effect, on the one hand, and of the photoelectric effect, on the other hand. In this case, the relationship (16-2) can be expressed in the following way:

$$\mu^i = a_{Co}\mu_{Co} + a_{Ph}\mu_{Ph} \quad (19)$$

where $\mu_{Co}$ is the vector of attenuation coefficients due to the Compton effect and $\mu_{Ph}$ is the vector of attenuation coefficients due to the photoelectric effect. The coefficients $a_{Co}$ and $a_{Ph}$ do not depend on energy. On the other hand, the vectors $\mu_{Co}$ and $\mu_{Ph}$ and, more generally, the attenuation functions $\mu_{Co}(E)$ and $\mu_{Ph}(E)$ each depend on energy E according to distinct dependency laws.

According to a second alternative, the vectors of the characteristic base are relating to different reference materials. Indeed, it is known that an attenuation coefficient of a material can be considered as the linear combination of two attenuation coefficients of two known materials, or even more, at an energy ranging from 10 keV to 200 keV.

By way of example, if the material of the object is a mixture of unit materials X, Y, Z, the relationship (16-2) can be written in the following way:

$$\mu^i = a_X \mu_X + a_Y \mu_Y + a_Z \mu_Z \quad (20)$$

$\mu_X, \mu_Y, \mu_Z$ are the vectors of the attenuation coefficients of the unit materials X, Y, Z respectively.

Regardless of the selected characteristic base $\mu_n$, n= 1, ..., N, the coefficients $\mu_n(h)$, h=1, ..., $N_h$, making up the base vectors, are assumed to be known by means of a prior calibration or simulation phase.

Generally, the base consists of N vectors. In particular, each vector is representative of a property of a given material as a function of energy. In the examples set forth in this description, the vectors are attenuation coefficients, in particular linear attenuation coefficients. Of course, they could be mass attenuation coefficients.

Block 320 represents a linearized model of the direct conversion spectrometer, represented by the response matrix of the system, $\Psi$. Using the attenuation model, 310, and the linearized model of the spectrometer, 320, the equivalent linear attenuation coefficient is expressed by means of the relationships (12) and (16-1):

$$\mu^{lin}(k) = \sum_{h=1}^{N_h} \sum_{n=1}^{N} a_n \Psi(k, h) \mu_n(h) \quad (21\text{-}1)$$

In a similar way, the equivalent linear attenuation is expressed using the relationships (12) and (18-1):

$$M^{lin}(k, L) = \sum_{h=1}^{N_h} \sum_{n=1}^{N} c_n(L) \Psi(k, h) \mu_n(h) \quad (21\text{-}2)$$

The expressions (21-1) and (21-2) can more simply be formulated in matrix form:

$$\mu^{lin} = \Psi B_\mu a \quad (22\text{-}1)$$

and $$M^{lin} = L \Psi B_\mu a = \Psi B_\mu c \quad (22\text{-}2)$$

where $\Psi$ is the response matrix of the system, $B_\mu$ is the matrix of size $N_h \times N$ the columns of which are the vectors $\mu^n$, n=1, ..., N of the characteristic base, $a = (a_1, ..., a_N)^T$ and $c = (La_1, ..., La_N)^T$.

The expressions (22-1) and (22-2) mean that the equivalent linear attenuation coefficient/equivalent linear attenuation can be resolved in a second base, being an image of the characteristic base by the linearized response of the system, which is represented by the matrix $\Psi$. In other words, the image base consists of the column vectors of the matrix $A_\mu = \Psi B_\mu$ of size $N_k \times N$ with the same components as those of the actual attenuation coefficient/attenuation in the characteristic base.

The expressions (22-1) and (22-2) provide a linear model of the attenuation measurements since the $\mu^{lin}$ components do not depend on L and those of $M^{lin}$ are proportional to L.

Block 330 represents a model of the attenuation measurements by means of the actual spectrometer. With a given resolution of the actual attenuation coefficient $\mu^i$ in the base $B_\mu$, is associated an attenuation measurement $M^d$ of the spectrometer. More precisely, with a resolution $a = (a_1, ..., a_N)^T$ of $\mu^i$ in this base, is associated the attenuation measurement:

$$M^d(L) = -\ln(\Psi e^{-LB_\mu a}) = -\ln(\Psi e^{-B_\mu c}) \quad (23)$$

where the expressions $e^X$ and $\ln(X)$, X being a vector, respectively represent vectors of the same size as X the elements of which are respectively $e^{X(m)}$ and $\ln(X(m))$ where $X(m)$ are the elements of X.

The vector $M_c = B_\mu c$, $M_c = (M_c(1), ..., M_c(N_h))^T$ represents the measurement that would be obtained if the detector were ideal, the matrix $\Psi$ being equal to identity, with $N_k = N_h$.

The transformation T between 320 and 330 allows to switch directly from the linear model to the non-linear model of the actual spectrometer. This transformation is actually a dispersion function operating on the components of the equivalent linear attenuation vector $M^{lin}$ in the image of the characteristic base. More precisely, with a vector $$M^{lin} = A_\mu c = \sum_{n=1}^{N} c_n \Psi \mu_n,$$

is associated the vector $T(M^{lin}) = M^d$ with $$M^d = \sum_{n=1}^{N} c_n W^d \Psi \mu_n$$

where $W^d = \text{Diag}(W^d(1,L), ..., W^d(N_k,L))$ is a diagonal matrix of size $N_k \times N_k$ the elements of which are given by:

$$W^d(k, L) = \frac{-\ln\left(\sum_{h=1}^{N_h} \Psi(k, h) e^{-M_c(h)}\right)}{\sum_{h=1}^{N_h} \Psi(k, h) M_c(h)} \quad (24)$$

It will be understood that the transformation T matches up a scalar $c_n$, being applied identically to all energy components of a vector $\Psi \mu_n$, with a matrix $T(c_n) = c_n W^d$ of size $N_k$ the diagonal coefficients of which can differ. Thus, the transformation T represents an energy dispersion mechanism. It can be seen as a deformation of each coefficient $c_n$ as a function of the energy component to which it is applied or, equivalently, as a deformation of the vectors $\Psi \mu_n$, n= 1, ..., N, the matrix $W^d$ weighting differently the energy components of these vectors. It will be noted that when the thickness L through which the radiation passes is low, the values are such that $c_n \mu_n(h) \ll 1$ and the matrix $W^d$ is close to the identity matrix. Because of the convexity of the function $-\ln(x)$, the elements $W^d(k,L)$ are strictly between the values 0 and 1.

Figure 4:
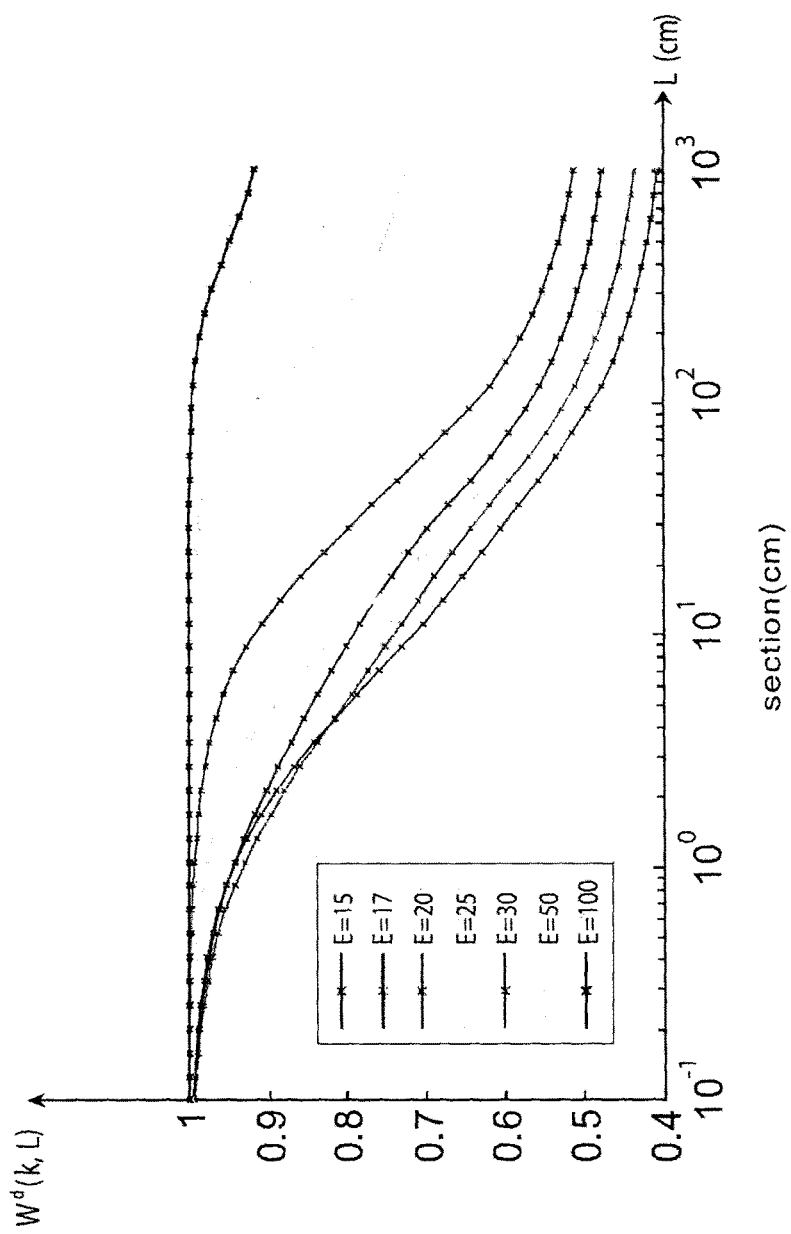
FIG. 4 represents examples of non-linear deformation curves used in the model of FIG. 3.

FIG. 4 represents the dispersion of coefficients $c_n$ as a function of the thickness L through which the radiation passes. More precisely, this figure represents the deformation function $$W^d(k, L) = \frac{-\ln\left(\sum_{h=1}^{N_h} \Psi(k, h)e^{-M_c(h)}\right)}{\sum_{h=1}^{N_h} \Psi(k, h)M_c(h)}$$

of each of the $N_k$ components of the vector $M^{lin}$ in the image base, as a function of the thickness L through which the radiation passes. It is clearly seen that, for low L values, the weighting coefficients $W^d(k,L)$ are close to 1 and consequently the components are not deformed. On the other hand, the deformation becomes higher for higher thickness values, in particular for low energies.

Figure 5:
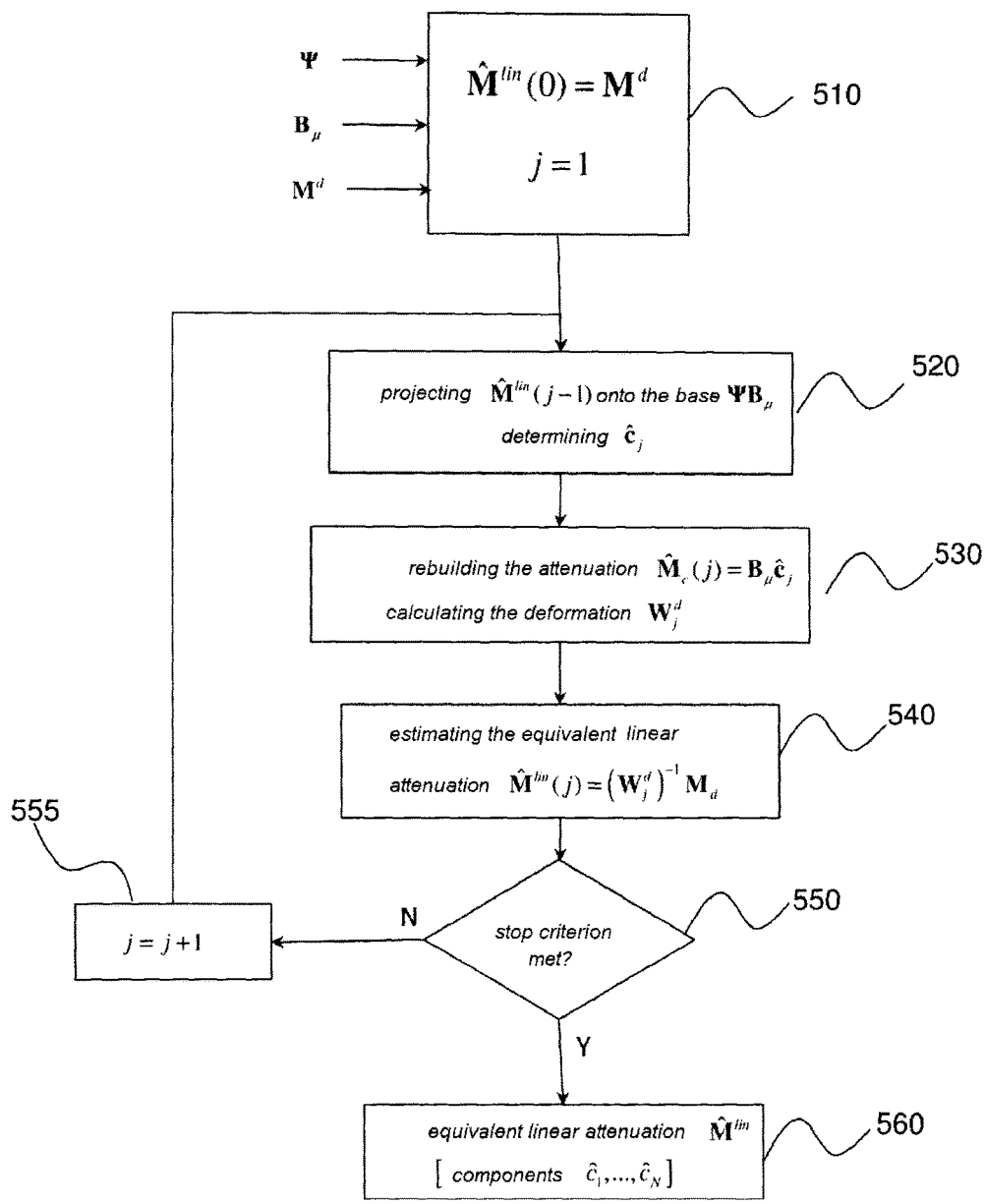
FIG. 5 represents a flow chart of a method for linearizing attenuation measurements obtained by means of a direct conversion spectrometer, according to one embodiment of the invention.

FIG. 5 represents a method for linearizing attenuation measurements obtained by means of a direct conversion spectrometer, according to one embodiment of the invention.

The linearization method assumes that at least one attenuation measurement has been performed in a plurality of energy bins, $k=1, \ldots, N_k$, by means of said spectrometer. This measurement is represented by a vector $M^d = (M^d(1), \ldots, M^d(N_k))^T$ where $M^d(k)$ is obtained as the natural logarithm of the ratio between the number of photons detected in the channel k with and without the object.

It is assumed that the response matrix of the system, $\Psi$, is also known, by means of a prior calibration or simulation. It is reminded that this matrix of size $N_k \times N_h$ gives, under full flow conditions, the probability that a photon is detected in a channel k of the spectrometer when it has been emitted in an energy bin h.

Finally, it is assumed that a base of vectors, $B_\mu$, characteristic of the attenuation of the material is known, in other words a plurality N of vectors on which the actual attenuation coefficient of the material can be resolved, as set forth above.

In step 510, the estimation of the equivalent linear attenuation vector, $M^{lin}$, is initialized, by the attenuation vector $M^d$ measured, that is $\hat{M}^{lin}(0)=M^d$. Indeed, it can be considered, in first approximation, that the attenuation vector measured is an estimate of the equivalent linear attenuation vector. The iteration counter j is initialized to 1.

The method for linearizing attenuation measurements then operates by successive iterations, fining gradually the $M^{lin}$ estimate. The $M^{lin}$ estimate is noted $\hat{M}^{lin}(j)$ at the iteration j.

In step 520, the $M^{lin}$ estimate obtained at the previous iteration is projected, that is $\hat{M}^{lin}(j-1)$, onto the base $A_\mu = \Psi B_\mu$, image of the characteristic base $B_\mu$ by the response of the system $\Psi$, in other words, the coefficients $\hat{c}_n(j)$, n= 1, ..., N are determined such that:

$$\hat{M}^{lin}(j-1) = \sum_{n=1}^{N} \hat{c}_n(j)\Psi\mu_n = A_\mu \hat{c}(j) \tag{25}$$

where $\hat{c}(j) = (\hat{c}_1(j), \ldots, \hat{c}_N(j))^T$. Given that there is generally $N \ll N_k$, the system of $N_k$ equations with N unknowns (25) is over-determined and it is resolved according to a least squares criterion. The vector $\hat{c}(j)$ is for example determined by:

$$\hat{c}(j) = A_\mu^\dagger \hat{M}^{lin}(j-1) \tag{26}$$

where $A_\mu^\dagger = A_\mu^T(A_\mu A_\mu^T)^{-1}$ is the pseudo-inverse of the matrix $A_\mu$.

In step 530, the non-linear deformation to be applied to the components of $\hat{M}^{lin}(j-1)$ in the image base, $\Psi\mu_n$, calculated to obtain the attenuation measured by means of the spectrometer:

$$W_j^d(k) = \frac{-\ln\left(\sum_{h=1}^{N_h} \Psi(k, h)e^{-\hat{M}_c(j)(h)}\right)}{\sum_{h=1}^{N_h} \Psi(k, h)\hat{M}_c(j)(h)} \tag{27}$$

where $\hat{M}_c(j) = B_\mu \hat{c}_j$. In other words, each component $\hat{c}_n(j)$ is energy dispersed and gives rise to a plurality of coefficients for the different energies: $\hat{c}_n(j)W^d(1), \ldots, \hat{c}_n(j)W^d(N_k)$.

In step 540, the equivalent linear attenuation vector is estimated from the attenuation vector $M^d$:

$$\hat{M}^{lin}(j) = (W_j^d)^{-1}M^d \tag{28}$$

that is $$\hat{M}^{lin}(j)(k) = \frac{M^d(k)}{\hat{W}_j^d(k)}, k = 1, \ldots, N_k.$$

In step 550, it is checked whether a stop criterion is met.

According to a first alternative, the stop criterion is a predetermined maximum number of iterations $j_{max}$.

According to a second alternative, the stop criterion is a convergence condition. For example, it may be decided to stop iterations as soon as:

$$\frac{\|\hat{M}^{lin}(j) - \hat{M}^{lin}(j-1)\|}{\|\hat{M}^{lin}(j)\|} \leq \varepsilon_{Th} \tag{29}$$

where $\varepsilon_{Th}$ is a predetermined threshold and $\|\ \|$ designates the Euclidian vector norm.

If the stop criterion is met, the linearization method continues to step 560. If not, the iteration index j is incremented in 555 and goes back to step 520 for a new iteration.

In step 560, the estimate of the equivalent linear attenuation $\hat{M}^{lin} = (\hat{M}^{lin}(1), \ldots, \hat{M}^{lin}(N_k))^T$ is provided for the different energy channels of the spectrometer.

The linearization method can alternatively provide the vector of the components $\hat{c} = (\hat{c}_1, \ldots, \hat{c}_N)^T$ of the equivalent linear attenuation in the image of the characteristic base $\Psi B_\mu$. These components enable the material of the object to be characterized, and when applicable, when the vectors of the characteristic base are relating to reference materials, the composition thereof to be determined.

Figure 6:
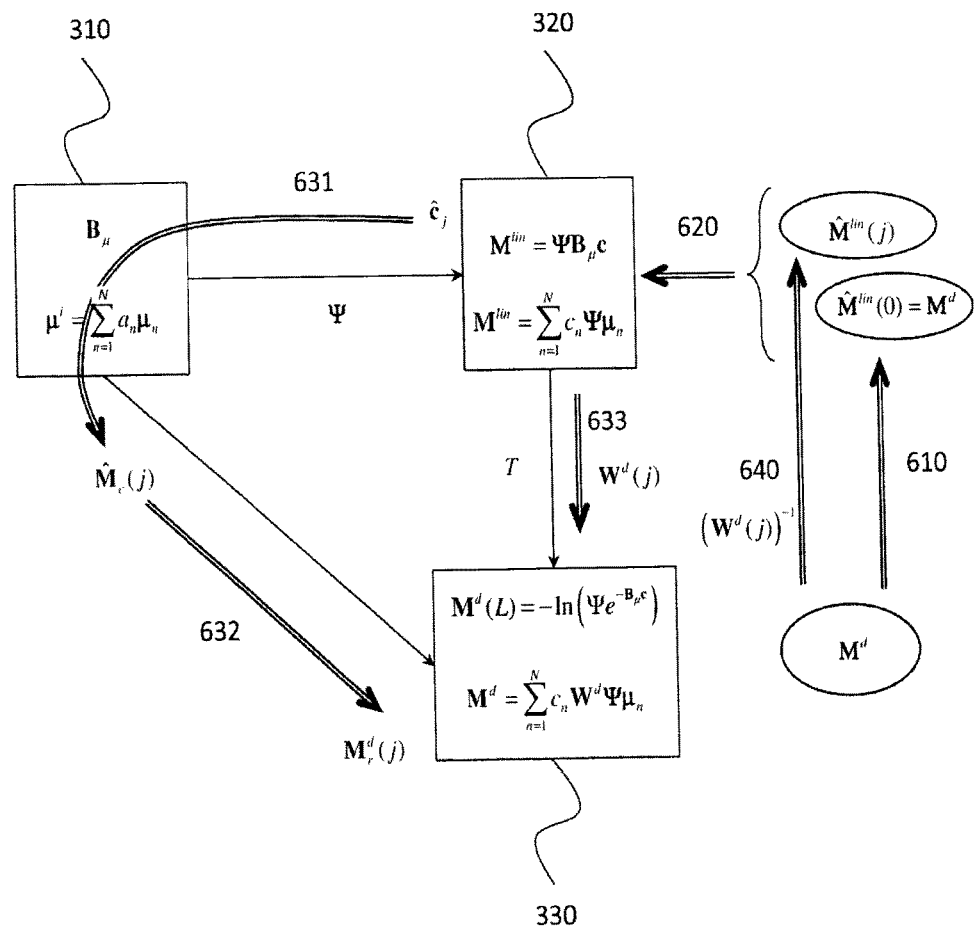
FIG. 6 represents the operating mode of the method for linearizing attenuation measurements of FIG. 5 from the model of FIG. 3.

FIG. 6 represents as a graph the implementation of the method for linearizing attenuation measurements from the model of FIG. 3.

There is the model 310 of the attenuation of the material using the characteristic base $B_\mu$, the linear model of the attenuation measurements, 320, using the image of the characteristic base by the response of the system, $\Psi B_\mu$, and thus the non-linear model of the attenuation measurements 330, associated with the spectrometer.

The initialization operation, 610, consists of an approximation of the equivalent linear attenuation by the attenuation measurement $M^d$. This first estimate amounts to assuming that the deformation matrix $W_0^d$ is equal to the unit matrix.

The first operation, 620, is a projection of the estimate of the equivalent linear attenuation $\hat{M}^{lin}(j-1)$ onto the base $\Psi B_\mu$ of the linear model. It enables the $M^d$ components to be obtained in this base, which are represented by $\hat{c}_j$.

From this projection, an estimate of the attenuation of the material can be retrieved in 631, which estimate is expressed in the characteristic base, that is $\hat{M}_c(j) = B_\mu \hat{c}_j$.

The operation 632 consists in obtaining the attenuation measurement by means of the spectrometer assuming that the attenuation of the material is equal to $\hat{M}^i(j)$. This attenuation measurement is calculated thanks to the expression (23), that is:

$$M_r^d(j) = -\ln(\Psi e^{-B_\mu \hat{c}_j}) \quad (30)$$

where $M_r^d(j)$ is the attenuation measurement rebuilt from the components $\hat{c}_j$.

From the measurement $M_r^d(j)$ rebuilt and the estimate of the equivalent linear attenuation obtained in the previous iteration, $\hat{M}^{lin}(j-1)$, the transformation T allowing to switch from the linear model to the non-linear model, that is the diagonal matrix $W_j^d$ such that $W_j^d \hat{M}^{lin}(j-1) = M_r^d(j)$ is determined in 633.

Operations 631 to 633 are performed during step 530 of FIG. 5 as previously described.

The matrix $W_j^d$ (the transformation $T^{-1}$) is then used to obtain in 640 a new estimate of the equivalent linear attenuation thanks to the expression (28), that is $\hat{M}^{lin}(j) = (W_j^d)^{-1} M^d$.

Operations 620 to 640 are iterated until the estimate converges or until a predetermined maximum number of iterations is reached.

The corrective effect of linearization of the attenuation measurements obtained by means of the spectrometer will be illustrated hereinafter using one example.

Figure 7:
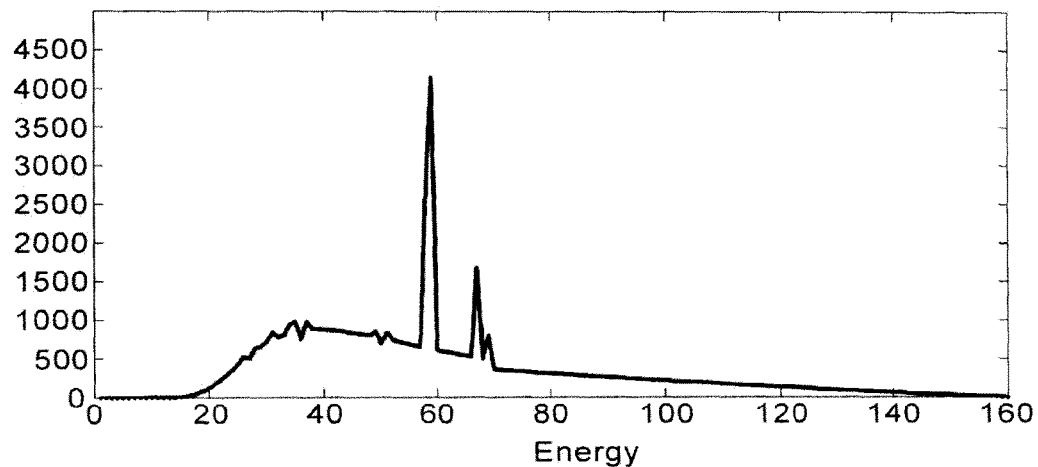
FIG. 7 represents an exemplary spectrum of a radiation source.

The source of the spectrometer is here a X radiation source using a tungsten cathode. The source spectrum is represented in FIG. 7.

The spectrometer detector is a CdTe sensor pixelised in 16 pixels (elementary sensors) with a 0.8 mm pitch and a 3 mm thickness, biased at −1 kV.

The object to be analyzed is made of polymethylmethacrylate (PMMA or Plexiglas™).

The characteristic base used is a base relating to two reference materials, namely polyethylene (PE) and polyoxymethylene (POM/Delrin™).

Figure 8:
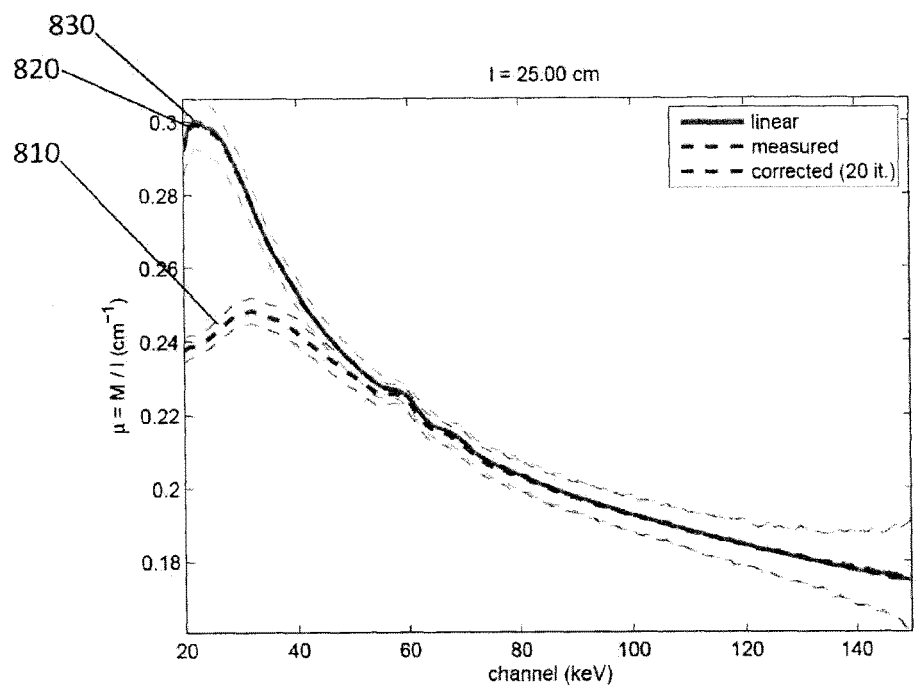
FIG. 8 illustrates the effect of the method for linearizing attenuation measurements in a particular example.

FIG. 8 shows the corrective effect provided by the linearization method within the scope of a so-called "full-spectral" measurement, that is when the number of energy channels is equal to the number of bins, $N_k = N_h$ (here 256 channels 1 keV wide). The acquisition of the attenuation measurements ($M^d$) is performed with an object made of POM the thickness of which is L=25 cm.

It is seen in FIG. 8 that the raw measurement (curve with dashed lines 810) causes the occurrence of a distortion with respect to the real equivalent linear attenuation coefficients (curve in solid line 820). This distortion is more visible for low energies. It is noticed that the correction obtained thanks to the linearization method according to the invention (curve in dashed lines 830) restores almost completely the theoretical measurements (ideal spectrometer).

Figure 9:
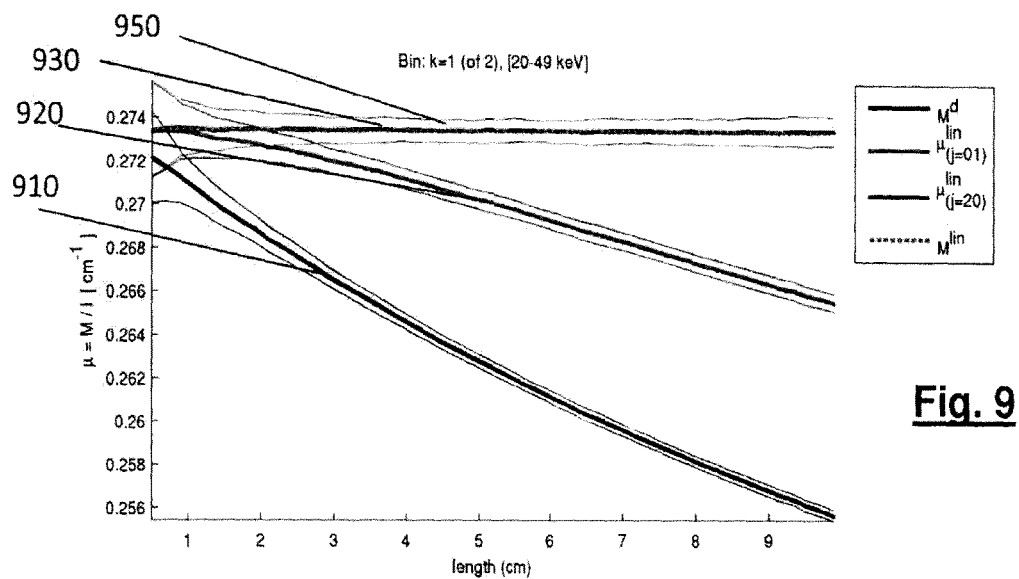
FIGS. 9 and 10 represent the attenuation coefficient as a function of the thickness of a material, for a first and a second energy channel, respectively.
Figure 10:
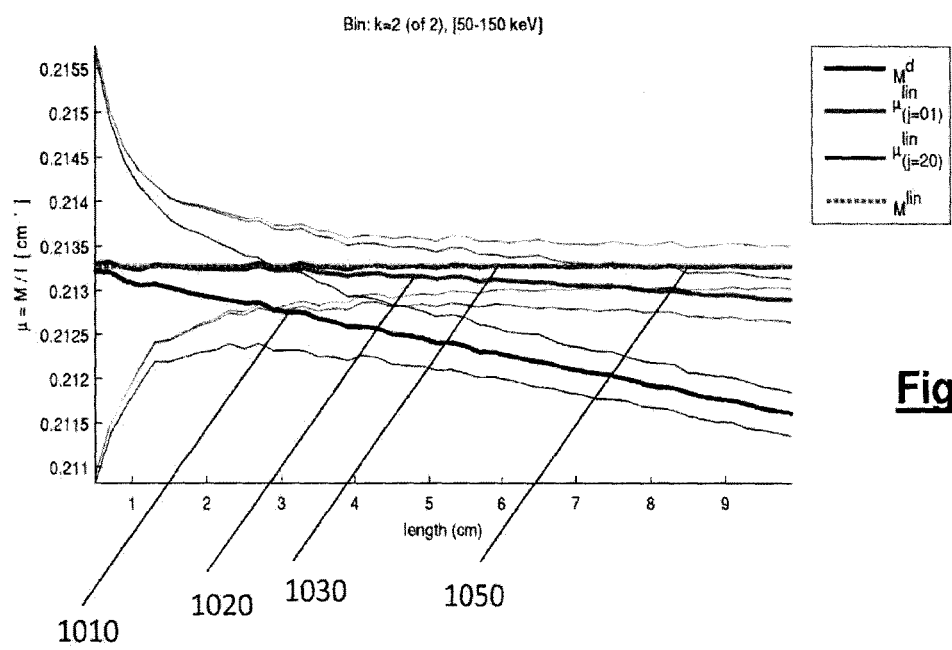

FIGS. 9 and 10 show the independence of the attenuation coefficient measurements as a function of the thickness of material through which the radiation passes, after linearization by the method according to the invention $$\left(\hat{\mu}^{lin} = \frac{1}{L} \hat{M}^{lin}\right).$$

The number of energy channels of the spectrometer is 2 ($N_k$=2).

FIGS. 9 and 10 are relating to the first energy channel (20-49 keV) and to the second energy channel, respectively.

The curves of attenuation coefficient before correction have been designated by 910 and 1010, the curves of attenuation coefficient after one iteration by 920 and 1020 and the curves of attenuation coefficient after 20 iterations by 930, 1040, respectively.

The theoretical measurements (ideal spectrometer) have also been represented by the curves in dashed lines 950 and 1050.

It is noticed that after 20 iterations, the equivalent linear attenuation coefficient is already constant and the same with the theoretical value.

The invention claimed is:

1. A method for measuring the attenuation of a radiation by generating an image of an object, comprising:
   irradiating the object with a radiation source;
   detecting with a direct conversion spectrometer that includes a detector, radiation emitted from the radiation source after it has passed through the object, said detection being carried out in a plurality $N_k$ of energy channels of the detector, actual attenuation of the material constituting the object being resolved according to a characteristic base of the attenuation in the material, $\mu_n$, n=1, . . . , N with N≥2;
   said direct conversion spectrometer being characterized by a response matrix $\Psi$ giving, for the plurality $N_k$ of energy channels of the detector, the probability that a photon emitted in an energy bin h=1, . . . , $N_h$ is detected in an energy channel,
   said method including estimating a vector $M^{lin}$, called an equivalent linear attenuation vector, giving for each energy channel an attenuation linearly depending on the thickness of the material through which the radiation passes, said method comprising
   an initialization step wherein $M^{lin}$ is estimated by a vector $M^d$ giving an attenuation of the radiation in the plurality of energy channels,
   and a succession of iterations, each iteration j providing an estimate $\hat{M}^{lin}(j)$ and comprising:
   (a) a step of projecting the estimate $\hat{M}^{lin}(j-1)$ of $M^{lin}$ obtained at a previous iteration onto an image base $\Psi\mu_n$, n=1, . . . , N, image by said response matrix $\Psi$ of said characteristic base of the attenuation of the material, the projection of $\hat{M}^{lin}(j-1)$ onto the image base $\Psi\mu_n$, n=1, . . . , N being performed by determining components $\hat{c}_1, \ldots, \hat{c}_N$ such that:

$$\hat{M}^{lin}(j-1) = \sum_{n=1}^{N} \hat{c}_n(j)\Psi\mu_n = A_\mu \hat{c}(j);$$

(b) a step of determining an energy non linear deformation, T, of the components of the estimate $\hat{M}^{lin}(j-1)$ for obtaining a corresponding attenuation $M_r^d(j)$ in different energy channels, in accordance with a non linear model of the spectrometer;
   (c) a step of reverse deformation of the components of $M^d$ to provide a new estimate $\hat{M}^{lin}(j)$ of the equivalent linear attenuation $M^{lin}$ of said attenuation measurement, or of the components $\hat{c}_1, \ldots, \hat{c}_N$ of said equivalent linear attenuation $M^{lin}$ in said image base, wherein the estimate of the equivalent linear attenuation $M^{lin}$ of said attenuation measurement, or the estimate of the components thereof, are provided as attenuation measurements, and the method includes generating the image of the object based on at least the detected radiation and on the new estimate $\hat{M}^{lin}(j)$ of the equivalent linear attenuation $M^{lin}$ of said attenuation measurement.

2. The method for measuring the attenuation according to claim 1, wherein the iterations are stopped when a predetermined number ($j_{max}$) of iterations is reached.

3. The method for measuring the attenuation according to claim 1, wherein the iterations are stopped when a convergence criterion of the estimate of the equivalent linear attenuation is met.

4. The method for measuring the attenuation according to claim 1, wherein the characteristic base of the material is a base of vectors $\mu_{Co}$, $\mu_{Ph}$ where $\mu_{Co}$ gives a linear attenuation coefficient of the radiation due to the Compton effect in the different energy bins and $\mu_{Ph}$ gives the attenuation coefficient of the radiation due to the photoelectric effect in the different energy bins, a vector of actual attenuation coefficients $\mu^i$ of the material in the different bins being obtained as a linear combination of the vectors $\mu_{Co}$, $\mu_{Ph}$.

5. The method for measuring the attenuation according to claim 1, wherein the characteristic base of the material is a base of vectors $\mu_n$, n=1, ..., N, relating to reference materials, each vector of this base giving actual attenuation coefficients in the different energy bins for a reference material.

6. The method for measuring the attenuation according to claim 1, wherein in step (a) of an iteration j, a vector $\hat{c}_j$ of size N is determined giving the components of $\hat{M}^{lin}(j-1)$ in the image base $\Psi\mu_n$, n=1, ..., N.

7. The method for measuring the attenuation according to claim 6, wherein the non-linear transformation T is determined by estimating actual attenuation in the material from $\hat{M}_t(j) = B_\mu \hat{c}_j$, where $B_\mu$ is a matrix the columns of which consist of vectors $\mu_n$, n=1, ..., N, and by calculating a diagonal matrix $W_j^d$ such that $W_j^d \hat{M}^{lin}(j-1) = M_r^d(j)$ where $M_r^d(j) = -\ln(\Psi_e^{-B_\mu \hat{c}_j})$.

8. The method for measuring the attenuation according to claim 7, wherein in step (c) of the iteration j, the new estimate $\hat{M}^{lin}(j)$ of the equivalent linear attenuation is obtained by means of $\hat{M}^{lin}(j) = (W_j^d)^{-1} M^d$.

9. The method for measuring the attenuation according to claim 5, further providing a characterization of the material from the components $\hat{c}_1, \ldots, \hat{c}_N$ of said equivalent linear attenuation vector $M^{lin}$ in said image base.

10. The method for measuring the attenuation according to claim 9, said characterization is a composition of the material in said reference materials.

11. A system for measuring the attenuation of a radiation by an object, comprising:

a radiation source configured to irradiate the object; and a direct conversion spectrometer that includes a detector configured to detect radiation emitted from the radiation source after it has passed through the object, said detection being carried out in a plurality $N_k$ of energy channels of the detector, actual attenuation of the material constituting the object being resolved according to a characteristic base of the attenuation in the material, $\mu_n$, n=1, ..., N with N≥2;

said direct conversion spectrometer being characterized by a response matrix $\Psi$ giving, for the plurality $N_k$ of energy channels of the detector, the probability that a photon emitted in an energy bin h=1, ..., $N_h$ is detected in an energy channel, said direct conversion spectrometer being configured to estimate a vector $M^{lin}$, called an equivalent linear attenuation vector, giving for each energy channel an attenuation linearly depending on the thickness of the material through which the radiation passes, said direct conversion spectrometer being configured to perform an initialization step wherein $M^{lin}$ is estimated by a vector $M^d$ giving an attenuation of the radiation in the plurality of the energy channels and perform a succession of iterations, each iteration j providing an estimate $\hat{M}^{lin}(j)$ and comprising:

(a) a step of projecting the estimate $\hat{M}^{lin}(j-1)$ of $M^{lin}$ obtained at a previous iteration onto an image base $\Psi\mu_n$, n=1, ..., N, image by said response matrix $\Psi$ of said characteristic base of the attenuation of the material, the projection of $\hat{M}^{lin}(j-1)$ onto the image base $\Psi\mu_n$, n=1, ..., N being performed by determining components $\hat{c}_1, \ldots, \hat{c}_N$ such that:

$$\hat{M}^{lin}(j-1) = \sum_{n=1}^{N} \hat{c}_n(j)\Psi\mu_n = A_\mu \hat{c}(j);$$

(b) a step of determining an energy non linear deformation, T, of the components of the estimate $\hat{M}^{lin}(j-1)$ for obtaining a corresponding attenuation $M_r^d(j)$ in different energy channels, in accordance with a non linear model of the spectrometer;

(c) a step of reverse deformation of the components of $M^d$ to provide a new estimate $\hat{M}^{lin}(j)$ of the equivalent linear attenuation $M^{lin}$ of said attenuation measurement, or of the components $\hat{c}_1, \ldots, \hat{c}_N$ of said equivalent linear attenuation $M^{lin}$ in said image base, wherein the estimate of the equivalent linear attenuation $M^{lin}$ of said attenuation measurement, or the estimate of the components thereof, are provided as attenuation measurements, and the system is configured to generate an image of the object based on at least the detected radiation and on the new estimate $\hat{M}^{lin}(j)$ of the equivalent linear attenuation $M^{lin}$ of said attenuation measurement.

* * * * *